Dec. 14, 1948.  I. W. WEPPLO  2,456,097
FUEL VAPORIZER
Filed Dec. 1, 1945  2 Sheets-Sheet 1
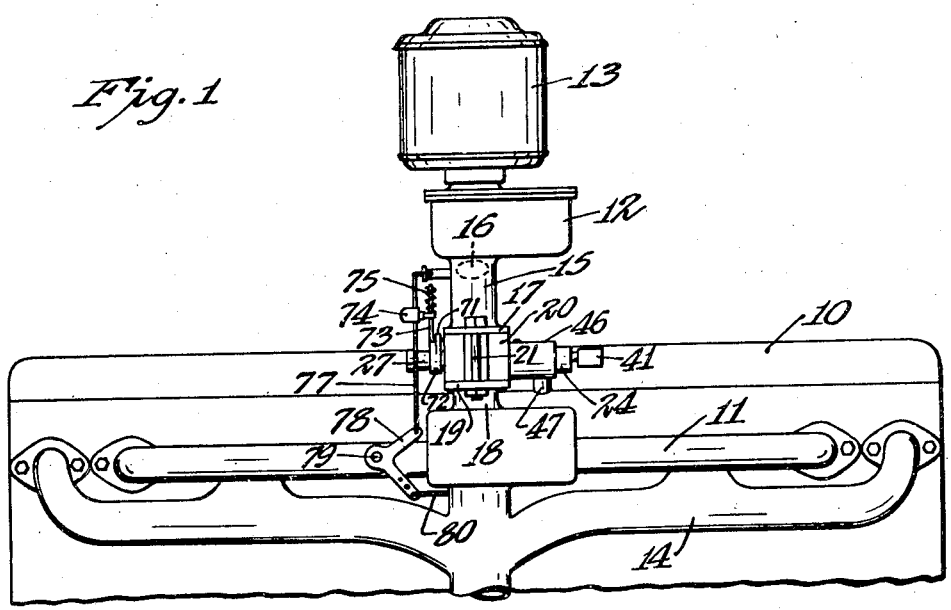
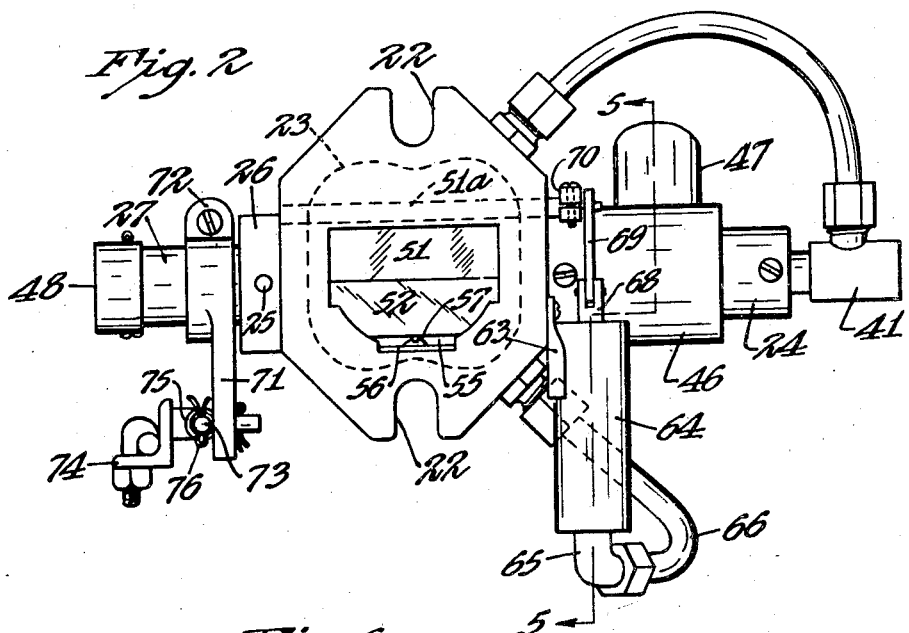
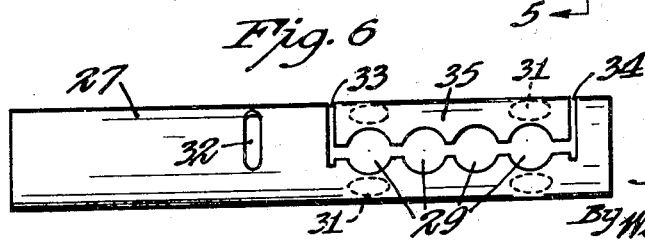
Inventor
Isaac W. Wepplo
By Williamson + Williamson
Attorneys Dec. 14, 1948.   I. W. WEPPLO   2,456,097
FUEL VAPORIZER Filed Dec. 1, 1945   2 Sheets-Sheet 2

Inventor
Isaac W. Wepplo
By Williamson & Williamson
Attorneys

Patented Dec. 14, 1948

2,456,097

UNITED STATES PATENT OFFICE 2,456,097

FUEL VAPORIZER

Isaac W. Wepplo, Minneapolis, Minn.

Application December 1, 1945, Serial No. 632,157

2 Claims. (Cl. 48—180)

This invention relates to liquid fuel vaporizers particularly adapted for use in internal combustion engines.

The vaporizer is adapted to be located between the conventional liquid fuel carburetor and the intake manifold of an internal combustion engine, and its general object is to provide means for more efficiently breaking down the liquid fuel and mixing it with air in order to produce a more efficient gaseous mixture.

In my prior Patents No. 2,010,973, issued August 13, 1935, entitled "Gasoline vaporizer," No. 2,318,824, issued May 3, 1943, entitled "Fuel vaporizer" and No. 2,373,867, issued April 17, 1945, entitled "Liquid fuel vaporizer," I have disclosed devices which are adapted for the same general purposes as the present invention. In these prior patents I have shown screens for breaking up the finely divided droplets of liquid fuel in combination with auxiliary air inlet means, the latter being controlled by the amount of negative pressure in the intake manifold.

Although the screens used in combination with the auxiliary pressure controlled intake proved effective and increased the efficiency of internal combustion engines with a given amount of fuel I have subsequently found that even greater efficiency can be obtained if the screens are eliminated and other means is provided for producing a finely divided liquid mixed with a controlled amount of auxiliary air. Through experimentation I have determined that where screens are used there is a tendency for the screens to become more or less clogged with liquid fuel when the engine is idling or operating at low speeds.

One of the objects of the invention is to provide a fuel vaporizer wherein no screens are used but wherein the fuel mixture is attained with a greater degree of efficiency after such mixture has left the conventional carburetor and before it is introduced into the engine cylinders.

Another object of the invention is to provide a fuel intake pressure and flow influenced valve which may or may not be used in conjunction with an auxiliary air intake but which operates independently of the conventional carburetor butterfly valve and acts in direct response to the negative fuel intake pressure. This valve is so arranged that a smaller intake flow opening is provided while the engine is idling or running at low speeds and a progressively larger intake flow is permitted as the engine speed or its load is increased.

Still a further object of the invention is to provide a fuel vaporizer having a valve as described above in combination with a valve control, the latter being subject to the engine intake pressure and working against the tendency of the valve to open under intake pressure flow in order to properly control the opening and closing of said valve.

A further object of the invention is to provide a pressure and flow responsive unit in combination with baffle means which produces a cyclonic action to break down the tiny droplets of fuel to even smaller size and thoroughly mix them with air so that a highly efficient firing mixture is obtained.

Still another object of the invention is to provide a vaporizer of the type described above in combination with an auxiliary air inlet which is so arranged relative to the pressure control valve and baffle means that the cyclonic mixing action is enhanced.

The above and other objects and advantages of the invention will more fully appear from the following description made in connection with the accompanying drawings, wherein like reference characters refer to the same parts throughout the views, and, in which:

Figure 1 is a side elevation of a portion of an internal combustion engine with my invention incorporated therewith;

Figure 2 is a plan view of the vaporizer per se on an enlarged scale;

Figure 6 is a plan view of a portion of the auxiliary air inlet valve.

Figure 3:
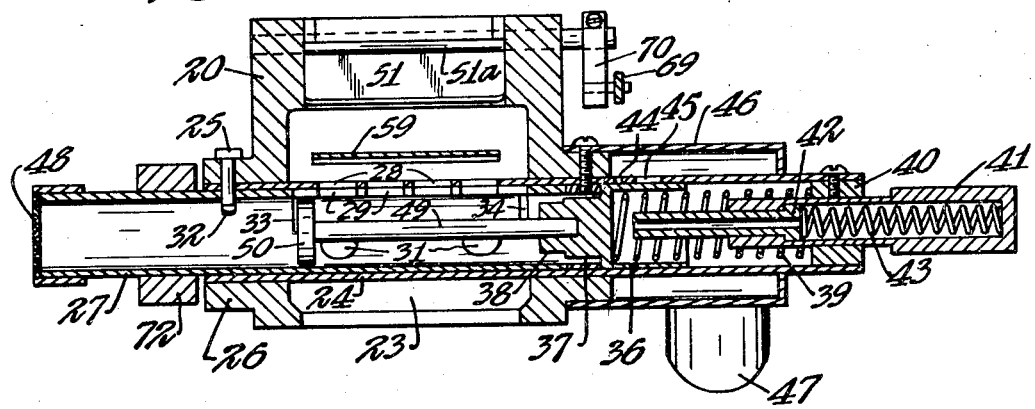
Figure 3 is a longitudinal vertical sectional view through the vaporizer shown in Figure 2.

In Figure 1 there is shown the upper portion of an internal combustion engine 10 upon which is mounted an intake manifold 11 which has connected therewith a carburetor 12 and upon which is mounted an air cleaner 13. An exhaust manifold 14 is also shown but it bears no relation to the present invention.

The lower portion of the carburetor 12 includes a pipe 15 having a conventional butterfly valve 16 therein. The lower end of the pipe 15 is provided with a flange 17. The central portion of the intake manifold 11 includes a short pipe section 18 having a flange 19 similar to the flange 17 on the carburetor outlet pipe 15. In conventional engine constructions the flanges 17 and 19 are bolted together. In installing my engine the vaporizer body 20 is interposed between the flanges 17 and 19 and the unit is connected by nutted bolts 21 which extend through the flanges 17 and 19 and lie in notches 22 formed in the vaporizer body as illustrated in Figure 2.

The vaporizer body 20 defines a chamber 23 within which is mounted a stationary sleeve 24 which is secured against rotation by a pin 25 extending through a squared projection 26 on the left hand side of the vaporizer body 20 as viewed in Figures 2 and 3. The sleeve 24 extends to the right through the vaporizer body and some distance outwardly therefrom. Within said stationary sleeve 24 is mounted a sleeve 27 which is rotatable relative to the stationary sleeve 24. The sleeve 27 is illustrated in Figure 6

Figure 4:
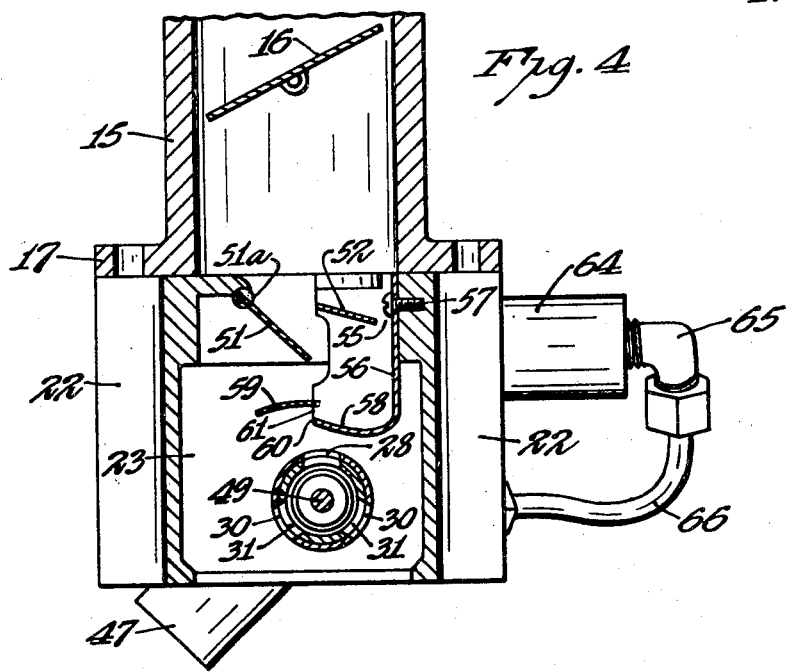
Figure 4 is a transverse vertical sectional view therethrough.

The stationary sleeve 24 is provided with a plurality of apertures 28 in its upper side which are adapted to register with an elongated aperture 29 formed in the inner movable sleeve 27 when said sleeve is turned to the proper position. The outer stationary sleeve 24 is provided with lower outlet apertures 30, as shown in Figure 4, which are adapted to register with apertures 31 in the inner sleeve 27. The limit of movement of the sleeve 27 is determined by the length of a slot 32 formed in said inner sleeve, as shown in Figures 3 and 6, the pin 25 being extended through said slot 32. The length of the slot 32 is such that the openings in the stationary outer sleeve and the rotary inner sleeve can be brought completely into and out of registration.

It should be noted in Figure 6 that the inner sleeve 27 is partially cut transversely at 33 and 34 so that the portion 35 of the sleeve 27 can expand slightly to closely fit the interior of the stationary sleeve 24, thereby making a tight seal between the two sleeves when the openings in said sleeves are out of registration.

The outer sleeve 24 carries a piston 36 shown in Figure 3, and, as shown, its right hand portion closely fits the interior of the sleeve 24 and its left hand portion is reduced in diameter so that the latter portion can enter the sleeve 27. It will be seen in Figure 3 that the reduced left hand portion 37 of the piston 36 is spaced inwardly from the wall of the rotary sleeve 27 and there is an even further reduced portion 38 at the extreme left hand end of the piston 36.

The right hand end of the piston 36 is hollowed out and receives a coil spring 39 which extends to the right and bears against a plug 40 in the right hand end of the stationary outer sleeve 24. A member 41 extends through the plug 40 and into the outer sleeve 24 and has slidably mounted therein a piston element 42. A second and smaller coil spring 43 lies in the element 41 and bears against the piston 42 yieldably urging it to the left, the extreme position thereof being shown in Figure 3.

Closely adjacent the point where the sleeve 24 enters the right hand side of the vaporizer body 20 is a small bleeder opening 44, and somewhat outwardly from said bleeder opening is a second and larger opening 45.

About the sleeve 24 and the openings 44 and 45 is a casing 46 having an air inlet spout 47.

At the left hand end of the rotary inner sleeve 27 is a screened opening 48.

A rod 49 extends inwardly into the casing and in the sleeve 27 from the piston 36 and the left hand end of said rod is provided with a head 50. When the negative pressure in the intake manifold is increased there will be an increased suction and flow through the chamber 23 causing more fuel to be drawn from the carburetor and also causing the piston 36 to be drawn to the right by reason of air entering the screened opening 48 and exerting pressure on the head 50 of the rod 49 which is connected to said piston 36. Thereupon the piston 36 will initially expose the small air inlet opening 44 in the sleeve 24 This action is continued until the piston 36 encounters the left hand end of the smaller piston 42. Upon a further increase in intake suction the piston 36 will remain stationary until the suction is sufficient to overcome the spring 39 and also the spring 43 which bears against the smaller piston 42. When the piston 36 has made contact with the smaller piston 42 the reduced portion 37 on said piston 36 will be in flow communication with the air inlet opening 44 and upon a further increase in intake suction the piston 36 will move more to the right so that the smallest diameter 38 on the piston 36 will be brought into registry with the opening 44 thereby increasing the auxiliary air entering through the spout 47. As described in my prior Patent No. 2,373,867 the auxiliary air will pass out through the openings in the sleeves 27 and 24 with considerable speed and increase the diffusion and mixture of the fuel vapor coming from the carburetor 12.

The left hand end of the inner sleeve 27 extends outwardly beyond the outer sleeve 24 and carries a lever 71 secured thereto by means of a clamping collar 72. The outer end of the lever 71 is connected to a link 73 which extends through a connecting member 74. That portion of the link 73 which extends through said connecting member has a spring 75 thereon, said spring at its two ends bearing against the connecting member 74 and a cotter key 76. The connecting member 74 is mounted on a rod 77 which is connected between the carburetor butterfly valve 16 and a bell crank 78. The latter is shown in Figure 1 to be pivotally mounted at 79 on the intake manifold 11 and one arm of the bell crank 78 is connected to the usual throttle control lever 80. Therefore, when the throttle lever 80 is moved the rotary inner sleeve 27 will be moved in response to the throttle action to vary the registration of the air flow openings in the stationary sleeve 24 and the inner movable sleeve 27.

In Figure 4 there is shown an auxiliary butterfly 51 which is pivoted at 51a. As shown, the valve 51 does not extend across the upper entrance of the chamber 23. It engages a stop or baffle member 52 when said butterfly 51 is in its nearly horizontal or closed position. The baffle 52 extends across the chamber 23. There is a space 55 between said baffle 52 and the right hand side wall of the chamber 23 as viewed in Figure 4. Another baffle 56 has a vertical portion secured to the casing side wall as by a bolt 57 and the lower portion of the baffle 56 is curved inwardly and slightly upwardly as at 58. A third baffle 59 lies across the central portion of the chamber 23 and slightly above the discharge edge 60 of the baffle 56, 58 thus providing an air flow passage 61.

Secured to the outer side of the vaporizer body 20 by bolts 62 is a bracket 63 supporting a cylinder 64. As viewed in Figure 5 the cylinder 64 has its left hand end connected by a nipple 65 to a tube 66 which in turn communicates with the lower portion of the chamber 23. A piston rod 67 operates in the cylinder 64 and its piston rod 68 is connected by a pivoted link 69 to a lever 70 which is mounted upon the auxiliary butterfly pivot shaft 51a.

Figure 5:
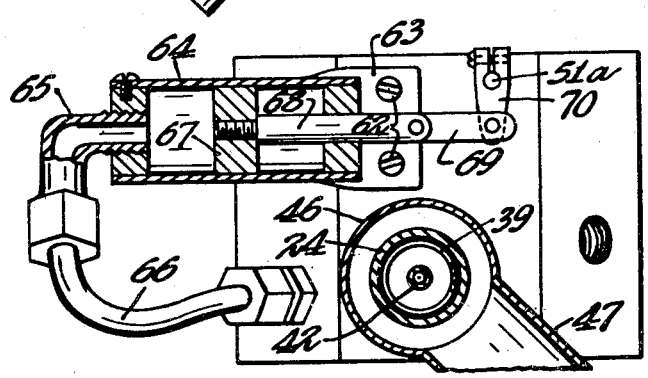
Figure 5 is a sectional view taken approximately on the line 5—5 of Figure 2.

When the engine is idling there is little intake pressure or suction and in view of the fact that there is a low velocity pressure flow exerted on the auxiliary butterfly 51 the piston 67 in the cylinder 64 will be moved to the left as viewed in Figure 5 or to the right as viewed in Figure 4, and the butterfly 51 will be kept in its closed position against the baffle 52. However, when the engine speed is increased and the intake suction becomes greater there is an increased flow through the vaporizer and the butterfly 51 is swung downwardly to an open position thereby permitting more of the gaseous fuel to flow through the vaporizer and the intake manifold 11. The butterfly 51 will open against the action of the piston 67 and the cylinder 64 inasmuch as there is less effective pressure area on the piston 67 than there is on the butterfly 51, but when the velocity and flow pressure decrease with a lowering of engine speed the piston 67 will be drawn by the negative intake pressure to tend to close the butterfly 51. Consequently, the action of the butterfly 51 is a free swinging one but it is dependent upon the actual intake manifold pressure and is arranged so that it will open only as the engine needs require.

When the butterfly 51 is closed there is still sufficient fuel provided for idling through the passageway 55 in the upper right hand part of the chamber 23 as shown in Figure 4.

As the fuel mixture enters the chamber 23 it is deflected to the right against the baffle 56, 58 which gives it a swirling motion across the chamber to the left and after it has been given this swirling motion it meets the auxiliary air entering through the sleeves 27 and 24. The velocity of flow is such that a cyclonic action is set up that breaks down the droplets of liquid fuel with greater effectiveness and the highly vaporized flow then passes on to the intake manifold. The transverse curvature of the baffle 59 in conjunction with the curvature of the baffle portion 58 helps to increase the swirling or cyclonic action of the mixture.

It should be noted that the auxiliary air inlet sleeves 24 and 27, as shown in Figure 4, are offset slightly to the right of the center of the chamber 23, and this offsetting has been found to work with a great deal of efficiency in combination with the butterfly and baffle arrangement above described to produce a highly efficient vaporization of the fuel.

It will, of course, be understood that various changes may be made in the form, details, arrangement and proportions of the various parts without departing from the scope of my invention.

What I claim is:

1. A fuel vaporizer for internal combustion engines adapted for use in the intake passage of the engine between the carburetor and intake manifold thereof comprising, a casing providing a chamber to be located between said carburetor and manifold and having an inlet and an outlet adapted for communication with said carburetor and manifold respectively, a butterfly valve in said chamber subject to the pressure flow of fuel intake gases through said chamber, said butterfly valve being of less extent when in a closed position than the cross sectional flow area of said chamber, thereby leaving a constantly open flow passage in said chamber, and a baffle in said chamber between said butterfly valve and the outlet side of said chamber, said baffle being directed beneath said butterfly valve from the opposite side of said chamber and extending only partially across said chamber.

2. The structure in claim 1, and an auxiliary baffle in said chamber closely adjacent and above the discharge edge of said first mentioned baffle.

ISAAC W. WEPPLO.

REFERENCES CITED

The following references are of record in the file of this patent:

UNITED STATES PATENTS

| Number | Name | Date |
|---|---|---|
| 2,010,973 | Wepplo | Aug. 13, 1935 |
| 2,200,723 | Reichhelm et al. | May 14, 1940 |
| 2,228,733 | Reichhelm et al. | Jan. 14, 1941 |
| 2,318,824 | Wepplo | May 11, 1943 |
| 2,373,867 | Wepplo | Apr. 17, 1945 |
| 2,396,279 | Metsger | Mar. 12, 1946 |
| 2,398,199 | Townsend | Apr. 9, 1946 |